United States Patent Office 3,191,784
Patented June 29, 1965

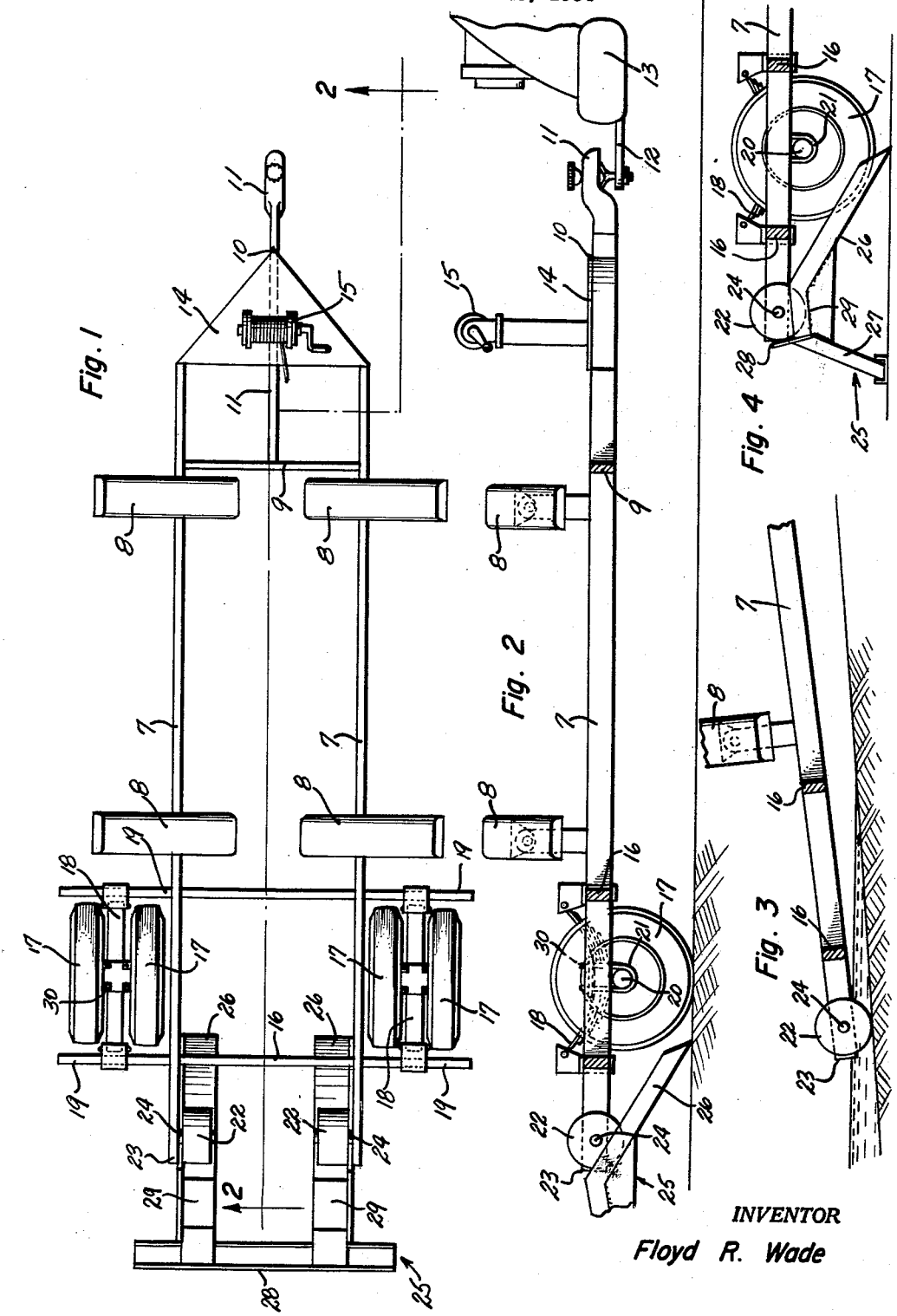
June 29, 1965  F. R. WADE  3,191,784
TRAILER FOR TWIN KEEL BOATS
Filed Jan. 15, 1964
INVENTOR
Floyd R. Wade

3,191,784
TRAILER FOR TWIN KEEL BOATS
Floyd R. Wade, 6278 Dairy Ave., Newark, Calif.
Filed Jan. 15, 1964, Ser. No. 337,804
2 Claims. (Cl. 214—38)

This invention relates to trailers for boats and, more particularly, to trailers for boats having twin keels, as described in my United States Patent No. 3,074,368 that was issued on January 22, 1963.

While the above noted patent clearly shows a trailer 10 in its FIGURE 1, no claim is made for the trailer, nor are any details of construction shown.

It is therefore the principal object of this present invention to provide a trailer specially constructed for twin keel boats, a trailer that can successfully carry the larger sized sail boat of the twin keel type and still be handled by one person.

Another object of this invention is to provide a trailer for twin keel boats, a trailer that has two separate sets of supporting wheels, one for use on the highway and one for use in the water when the boat is being loaded or unloaded from the trailer.

Another object of this invention is to provide a trailer for twin keel boats, a trailer that can be towed behind any automotive vehicle or the like by any desired available trailer hitch.

Another object of this invention is to provide a trailer for twin keel boats, a trailer that while being rigid in construction is also exceptionally light in weight by reason of its having a minimum number of well designed structural members.

Still another object of this invention is to provide a trailer for twin keel boats, a trailer that will effectively support the boat no matter how rough the highway over which it is being towed may be, without any danger whatever to the boat's falling off the trailer.

Other and subordinate objects together with the precise nature of my improvements will become apparent when the succeeding description and claims are read with reference to the accompanying drawing in which:

FIGURE 1 is a top view of this invention.

FIGURE 2 is a longitudinal sectional view of this invention as indicated by the arrowed lines and numerals 2—2 on FIGURE 1.

FIGURE 3 is a longitudinal sectional view of the rear portion of this invention showing its two small wheels for the water in working position.

FIGURE 4 is a longitudinal sectional view of the rear portion of this invention showing it raised off the ground and ready for the removal of the large wheels for highway use.

Referring now to FIGURES 1 and 2 of the drawing, it will be seen that this invention consists of a pair of equally spaced and parallel longitudinal members 7 having two pairs of adjustable boat support pads 8 secured thereto in longitudinal, spaced relation to each other as well as a front lateral brace member 9 that has one end secured to one of the aforesaid longitudinal members 7 and the other end secured to the like longitudinal members. The lateral brace member 9 is just rearward of the point where the two longitudinal members 7 are turned towards one another and connected together at 10 on each side of a longitudinal brace member 11 having one end that projects forward to rest on, and be secured to, the trailer hitch 12 that is centrally secured to the rear end of the automotive vehicle 13. The other end of the aforesaid longitudinal brace member 11 extends rearward to be secured to the center of the aforesaid lateral brace member 9.

A plate 14 having the configuration approximating that of an equilateral triangle when viewed from the top, and in the center and on top of which is placed a hand operated winch 15 whose cable is attached to the bow of the boat for the purpose of pulling the same up onto the trailer as will be understood by any person having experience in handling boats. The aforesaid winch 15 is supported in part from the underside of the aforesaid plate 14 by means of the just mentioned longitudinal brace member 11.

Returning to FIGURE 1 of the drawing, it will be seen that the rear portion of this invention is provided with a pair of equally spaced and parallel ground wheel-supporting members 16 that are rectangular in cross-section and deeper than are the aforesaid longitudinal members 7 which pass through suitable openings therein since the ground wheel-supporting members 16 are not only at right angle to the longitudinal members 7 but also extend out beyond the members in order to support the dual ground wheels 17 by means of the leaf springs 18 that have each end swingably secured to one of the cantilever ends 19 of the supporting members 16. Each set of ground support wheels 17 actually supports the stub axle 20 that is centrally secured to the underside of the leaf springs 18 by the U-bolt 21.

Continuing to look at FIGURE 1 of the drawing as well as at the other three figures, it will be seen that this invention is also provided with two small solid water wheels 22 that are secured to the rearmost ends 23 of the often mentioned longitudinal members by means of the stub axles 24. The purpose of the water wheels 22 is obvious from examination of the drawing in which is shown the two ramps 25 that may or may not be connected together according to the desires of its designer. The ramps 25 both embody an angularly disposed runner 26 and a brace 27 as well as a wheel stop 28.

When this trailer for twin keel boats having a boat thereon is backed up to the edge of the water in which it is desired to place the boat, one has only to take the ramps 25 and place them in the position shown in FIGURE 4 of the drawing and then back the rear end of the trailer up onto the same with the water wheels 22 resting on the top portion of the ramp 29 while the nuts 30 are removed from the U-bolt 21 and the dual wheels 17 are removed in order that the rear end of the trailer will rest on the two water wheels 22 when the trailer has been pulled off the ramp 25. The trailer is now backed into the water on its water wheels 22; and the hand winch 15 is slowly unwound, thereby letting the boat, which has been resting on the trailer with its sides against the inside portion of the aforesaid adjustable boat support pads 8, slide down in the water. This procedure, of course, is reversed when it is desired to remove the boat from the water.

It may be well to note that it is for reasons of clarity that I have purposely called the two pairs of big dual wheels the ground wheels 17 and the two small solid wheels 23 the water wheels as these two wheels are actually in the water when the boat is being loaded and unloaded from the trailer while the big dual wheels 17 are only used on the ground when the trailer is being moved from place to place.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A trailer for twin keel boats comprising, a boat supporting structure consisting of two equally spaced and parallel longitudinal members having their front ends converging to a point of contact, a longitudinal brace member having one end secured to said front ends at said point of contact, a lateral brace member having one end secured to the inside surface of one of the said parallel longitudinal members and the other end likewise secured to the other one of the said parallel longitudinal members, the longitudinal brace member extending rearward to the center of said lateral brace member and secured thereto, a plate having the configuration of an equilateral triangle secured to the top of said converging front ends, means connecting to said front ends for connecting said trailer to the rear of an automobile, a hand operated winch secured to the front end of the said boat supporting structure in order to haul the boat up on the said trailer, a plurality of ground supporting wheels two of which are one at each side of the boat supporting structure, two smaller wheels rotatably secured to the rear end of the boat supporting structure, a pair of equally spaced and parallel ground supporting wheel members each having openings therein, through which passes the said parallel longitudinal members which are at right angles to the said ground supporting wheel members, leaf springs at each side of the boat supporting structure, the ends of said leaf springs secured to corresponding ends of the ground supporting wheel members, a stub axle secured to the center of each leaf spring, a ground supporting wheel rotatably and removably secured to each stub axle, a ramp having inclined portions for each of the smaller wheels whereby the ground supporting wheels can be removed after the trailer has been elevated by backing said smaller wheels up onto said ramp.

2. A trailer for twin keel boats comprising, a boat supporting structure consisting of two equally spaced and parallel longitudinal members having their front ends converging to a point of contact, a longitudinal brace member having one end secured to said front ends at said point of contact, a lateral brace member having one end secured to the inside surface of one of the said parallel longitudinal members and the other end likewise secured to the other one of the said parallel longitudinal members, the longitudinal brace member extending rearward to the center of said lateral brace member and secured thereto, a plate having the configuration of an equilateral triangle secured to the top of said converging front ends, means connected to said front ends for connecting said trailer to the rear of an automotive vehicle, a plurality of adjustable pads secured to the boat supporting structure to contact the boat, a hand operated winch secured to the front end of the said boat supporting structure in order to haul the boat up onto the said trailer, a plurality of ground supporting wheels two of which are one at each side of the boat supporting structure, two smaller wheels rotatably secured to the rear end of the boat supporting structure, a pair of equally spaced and parallel ground supporting wheel members each having openings therein, through which passes the said parallel longitudinal members which are at right angles to the said ground supporting wheel members, leaf springs at each side of the boat supporting structure, the ends of said leaf springs secured to corresponding ends of the ground supporting wheel members, a stub axle secured to the center of each leaf spring, a ground supporting wheel rotatably and removably secured to each stub axle, a ramp having inclined portions for each of the smaller wheels whereby the ground supporting wheels can be removed after the trailer has been elevated by backing said smaller wheels up onto said ramp.

References Cited by the Examiner

UNITED STATES PATENTS

| 1,811,551 | 6/31 | Loening | 214—16.10 X |
| 2,932,418 | 4/60 | Ripley | 214—505 |
| 2,957,593 | 10/60 | Evans | 214—506 |
| 3,119,502 | 1/64 | Paul | 214—505 |

HUGO O. SCHULZ, *Primary Examiner.*

GERALD M. FORLENZA, *Examiner.*